United States Patent [19]
Bajars

[11] 3,978,200
[45] Aug. 31, 1976

[54] PROCESS FOR REDUCTION OF SULFUR DIOXIDE TO SULFUR

[75] Inventor: Laimonis Bajars, Princeton, N.J.

[73] Assignee: Catalysis Research Corporation, Palisades Park, N.J.

[22] Filed: Mar. 3, 1975

[21] Appl. No.: 554,354

Related U.S. Application Data

[62] Division of Ser. No. 339,252, March 8, 1973, abandoned.

[52] U.S. Cl. .............................................. 423/570
[51] Int. Cl.² ......................................... C01B 17/04
[58] Field of Search ............................. 423/564, 570

[56] References Cited
UNITED STATES PATENTS

| | | | |
|---|---|---|---|
| 3,615,221 | 10/1971 | McMillan | 423/570 |
| 3,752,877 | 8/1973 | Beavon | 423/564 |
| 3,864,459 | 2/1975 | Stiles | 423/570 |

FOREIGN PATENTS OR APPLICATIONS 591,924  1/1934  Germany

*Primary Examiner*—G. O. Peters
*Attorney, Agent, or Firm*—E. Janet Berry; Lawrence Rosen

[57]  ABSTRACT

Selective catalysts and processes using same in which $SO_x$ compounds are reduced to elemental sulfur in oxidation-reduction processes in which simultaneously oxidizable gases undergo oxidation.

4 Claims, 1 Drawing Figure

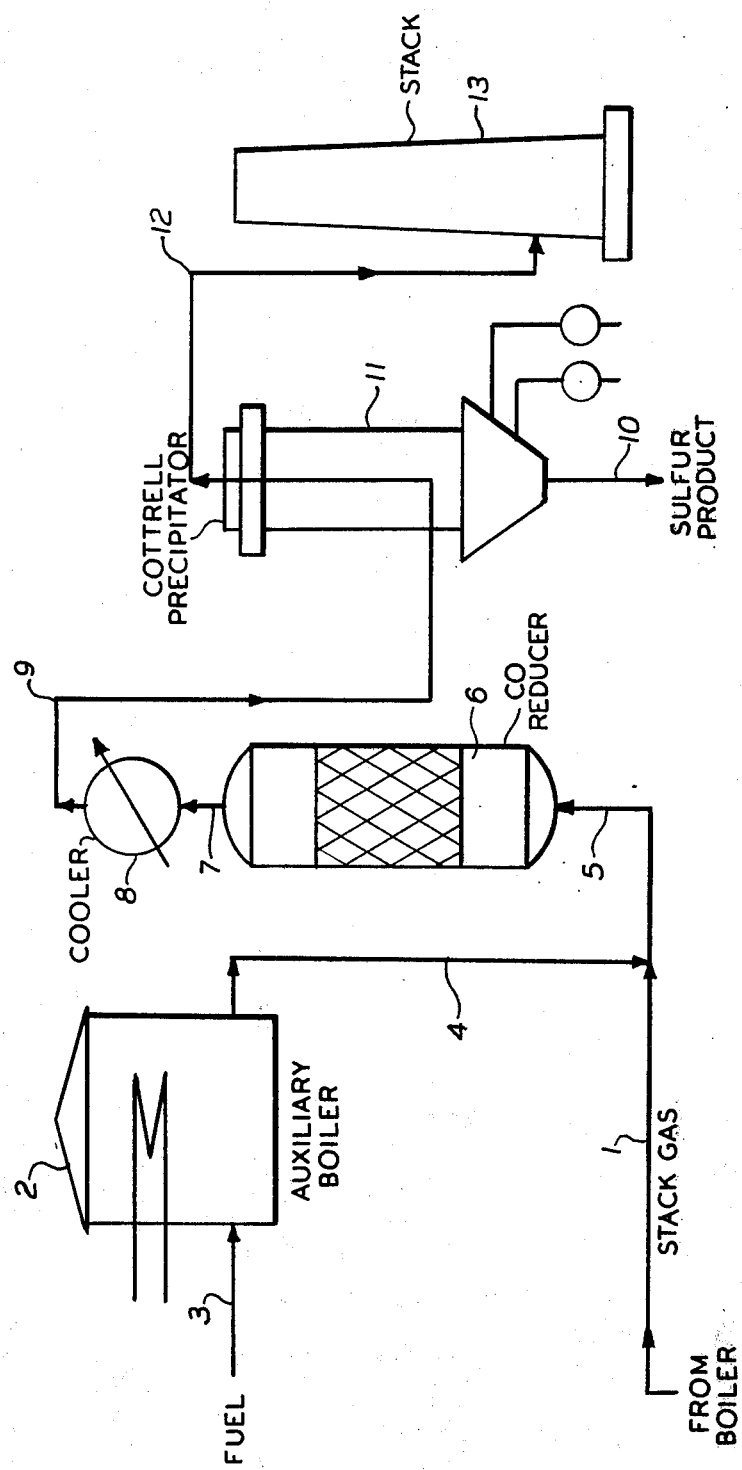

PROCESS FOR REDUCTION OF SULFUR DIOXIDE TO SULFUR

The present application is a divisional application of application Ser. No. 339,252, filed Mar. 8, 1973, now abandoned.

The invention broadly relates to processes and catalysts therefor whereby sulfur-oxygen gases are reduced to elemental sulfur and preferably at the same time an oxidizable gas is selectively oxidized. More specifically, the novel catalysts contemplated for the oxidation-reduction reaction are compounds composed of one or more elements of the lanthanide series, one or more elements of the group IVB and group VB elements and oxygen.

There has long been a need in technology for a convenient, clean, economical method whereby gaseous compounds of sulfur and oxygen can be reduced to yield elemental sulfur. The preferred method should be as a catalytic process, using an efficient catalyst of good stability and durability. This need has become increasingly acute because of the recent emphasis on clean air for the environment.

There has now been discovered compositions which function as catalysts in oxidation-reduction processes wherein gaseous sulfur oxides and gas streams containing same in varying quantities from 0.1 to 100 percent preferably 0.3–10 percent are treated to produce the valuable product, elemental sulfur.

The catalytic oxidation-reduction process of the invention is especially useful for purifying effluent gas streams containing $SO_x$ gaseous compounds from utilities, refinery, metallurgical, or chemical processing operations to produce elemental sulfur, a valuable product. Thus, the invention offers a practical method to recover the sulfur from gaseous compounds and by-product streams in the very useful form as elemental sulfur and at the same time, remove the obnoxious sulfur oxides from the effluent streams.

The catalysts which have been discovered and which form a fundamental part of this invention, are capable of effecting the reduction of $SO_x$ compounds to elemental sulfur and are both selective and highly active. They also are stable and durable for relatively long periods of continuous operation. When regeneration becomes necessary because of inactivation, the catalyst may be reactivated by treatment with reducing gases at an elevated temperature, for example using gaseous hydrogen or carbon monoxide at 600°C.

The catalysts which have been found of value are compositions which comprise primarily (1) one or more elements selected from the lanthanide series of elements and include lanthanum, cerium, and the commercial mixture designated as didymium, (2) one or more elements selected from the IVB or VB groups of the periodic table which groups include titanium, zirconium, vanadium, niobium, tantalum, and (3) oxygen. A typical example of a very good catalyst is a composition consisting of lanthanum, titanium and oxygen, i.e. a rare earth titanate. Such a composition is generally a synthetic mixture or compound.

The percentage composition of the catalyst compositions can be varied within very wide limits without loss of catalyst activity and selectivity.

Certain promoters can be used to improve the performance of the catalyst as regards selectivity and activity. Thus it has been found that the alkali and alkaline earth elements are useful as promoters for various reactions.

The process may be conducted at a relatively wide range of temperatures ranging from about 400°C. as the lowest practical temperature to 700°C., the highest operating temperature of electrostatic precipitators that is required for example to remove particulate matter from stack gases. These limits are of special importance in handling stack effluent gas as the source of feed material. The catalyst can be used to reduce $SO_2$ with CO at $CO:SO_2$ ratios varying from 1.0 to 2.5 in a gas mixture that contains 0.1 to 25 vol. % $SO_2$, CO, $CO_2$, and small amounts of $O_2$. The COS formation increases as the ratio of $CO:SO_2$ becomes greater than 1.0. In general, the amount of catalyst required varies with the quantity and composition of the gas which is being processed. The catalyst may be used in any one of a number of recognized commercial forms such as fixed beds, moving beds, fluidized beds, and homogeneous structures. It is not necessary to supply supports for this catalyst and the material does not powder or otherwise comminute under conditions of operation of the process.

One very important field of application for this novel catalytic process is its use for the removal of $SO_x$ compounds from flue gases. Although, in the past there have been described catalytic processes which reduce $SO_x$ compounds using CO to form elemental sulfur and $CO_2$, these processes are found to produce considerable amounts of COS, which is a serious disadvantage.

It is one great advantage of this catalytic process for the elimination of the $SO_x$ compounds from effluent gas streams that there is produced only negligible quantities of COS and at the same time the sulfur is recovered as elemental sulfur. It is important to minimize the production of COS and other useless and/or noxious by-products in processes for these applications.

The use of sulfur in feed stocks has been found effective in increasing catalyst activity for $SO_2$ reduction processes using alumina catalysts. It is likely that such additions will also be useful in improving the performance of the present catalyst.

These catalysts are very active and selective in oxidation-reduction reactions. Thus, these catalysts would find use both in existing chemical processes and in the development of new processes. Examples of such processes include $SO_2$ oxidation, $NO_x$ reduction, CO oxidation, water gas shift reaction, conversion of CO and $H_2$ to $CH_x$, conversion of $NH_3$ to $NO_x$, oxidation of low molecular weight hydrocarbons to oxygenated organic compounds, naphtha processing reactions such as reforming, aromatization, production of $NH_3$ from $N_2$ and $H_2$, and production of synthetic fuels.

The invention will be further illustrated by the following Examples which are intended to be illustrative only and it is not intended to limit the invention or claims in any way specifically thereto.

EXAMPLE 1

The catalyst used in these experiments was prepared as in the following manner: 38 grams of 99.99% pure $La(NO_3)_3.6H_2O$, supplied by Rare Earth Division of American Potash and Chemical Corporation was dissolved in 500 ml. of distilled water. To this solution was added 15.9 grams of certified grade Titanic Oxide (anhydrous) supplied by Fisher Scientific Company, the $TiO_2$ content corresponding to an atomic ratio of La:Ti of 0.44. The mixture was slurried by agitating the solution. 400 ml. of 18 wt. % $NH_4OH$ solution was then added to the mixture. The resultant precipitate was then filtered and washed with boiling distilled water to obtain a pH of 7. The precipitate was then dried at 170°C. for 12 hours in air. 3.5 Grams of the material which was screened to 14–20 mesh to remove the fines was charged to a Vycor reactor of a conventional flow apparatus and calcined under $N_2$ at 920°C. for 2.5 hours. The catalyst was then pretreated at 600°C. with a reducing gas flowing at a rate of 370 ml./min. and having the following composition: 75 vol. % CO and 25 vol. % $N_2$ for 2 hours. The reaction was conducted in the same Vycor glass reactor operated at atmospheric pressure and at a temperature of 450°C. A feed rate of 90 ml./min. measured at STP (0°C., 1 atm.) of a gas of the following composition: 81.5 vol. % $N_2$, 12 vol. % CO and 6.5 vol. % $SO_2$ was used to obtain a volume hourly space velocity of 1.55 liters measured at STP (0°C., 1 atm.) per hour per gram of catalyst. Operating at these conditions a product of the following composition was obtained: 86.57 vol. % $N_2$, 0.33 vol. % of CO, 12.4 vol. % $CO_2$, 0.01 vol. % COS and 0.69 vol. % $SO_2$. This corresponds to a 90 percent conversion of the $SO_2$ to elemental sulfur with less than 0.25 percent conversion of the $SO_2$ to COS. In additional similar experimental tests the selectivity and conversion remained constant over a period of ten hours at which time the most prolonged experiment was terminated.

EXAMPLE 2

A catalyst was prepared in the same fashion as described in Example 1, but with a La:Ti ratio of 1:1. This catalyst was reacted in the same Vycor reactor after pretreatment with 75 vol. % CO and 25 vol. % $N_2$ gas for 3 hours at 600°C. The reaction was conducted at a volumetric hourly space velocity of 3.7 liters measured at STP (0°C., 1 atm.) per hour per gram of catalyst. The feed gas composition was 10 vol. % CO, 5 vol. % $SO_2$ with the balance $N_2$. Reaction temperature was 470°C. Operating under these conditions 95% of the $SO_2$ was converted to elemental sulfur. 1.9% of the $SO_2$ in the feed was converted to COS.

This example indicates that the ratio of La:Ti can vary over a substantial range.

EXAMPLE 3

A catalyst was prepared consisting entirely of commercial grade $TiO_2$. The $TiO_2$ powder was slurried with water, dried, cracked and screened to 14–20 mesh to remove fines. This material was pretreated with a mixture of 75 vol. % CO and 25 vol. % $N_2$ at a temperature of 600°C. for a period of 3 hours. The catalyst was reacted in a similar fashion as described in Example 2. In this case only 0.75% of the $SO_2$ was converted to elemental S. 0.25% of the $SO_2$ was converted to COS. Thus $TiO_2$ by itself has very low catalytic activity.

EXAMPLE 4

A catalyst was prepared consisting of $La_2O_3$ which was obtained by calcination of a lanthanum hydroxide precipitate at 500°C. The calcined material was screened to a 14–20 mesh size and pretreated with a mixture of 75 vol. % CO and 25 vol. % $N_2$ at a temperature of 600°C. for a period of 3 hours. This catalyst was reacted in a similar fashion as in Example 2. In this case 20% of the $SO_2$ was converted to elemental sulfur. 4% of the $SO_2$ was converted to COS. Not only was the overall conversion low but a substantial proportion of COS was produced.

EXAMPLE 5

A typical process based on removal of $SO_2$ from stack gases is presented as an illustration of industrial application of the catalyst. The process design is explained in detail and to be understood in conjunction with the accompanying flow diagram figure.

Stack gas from a commercial boiler firing high sulfur fuel oil is delivered via line 1 at a temperature of about 500°C. to the reaction unit 6. This is admixed with a reducing gas in line 4 and containing CO and $H_2$ produced from a small auxiliary boiler 2 which is operating at less than theoretical air on a low sulfur fuel introduced via line 3. Alternatively CO or $H_2$ may be produced by other means, as desired. The combined stream in line 5 contains sufficient CO to react in the reactor 6 with the $SO_2$ present in the stack gases, reducing the $SO_2$ to elemental S. In some modifications it may be desirable although not necessary to incorporate separate facilities for removal of oxygen or water from the gases being treated.

The mixed hot gas stream in line 5 enters the reactor converter 6 filled with a packed bed of catalyst. The catalyst was prepared for example as described in Example 1. CO removes 90 percent of the incoming $SO_2$ converting it to sulfur in reactor 6.

After this selective reduction process, the exit gases are passed via line 7 to cooler 8 where they are cooled sufficiently to condense the sulfur produced. The exit stream from cooler 8 is passed via line 9 to Cottrell precipitator from which sulfur is removed as a solid product via bottom line 10. The cleaned sulfur free gas is at a sufficiently high temperature to be passed by line 12 for example to the power plant stack 13.

This system can be modified in several ways depending on circumstances and conditions. First, if coal is burned the Cottrell precipitator will remove both flyash and sulfur. If pure sulfur is needed, fly ash can be removed by suitable equipment located ahead of the catalytic converter. CO can be produced by passage of clean stack gas (containing $CO_2$) through a bed of coke. Alternatively, by passage of stack gas over sponge iron (as in the steam-hydrogen process) CO can be produced as a product. The iron is intermittently regenerated in this process. Finally, passage of stack gas through a coke bed can be employed to remove fly ash and to partially remove oxygen. Thus the proposed system has considerable flexibility in actual operation and design.

What is claimed is:

1. The process for reducing gaseous sulfur oxides to elemental sulfur by contacting a gaseous sulfur oxide with carbon monoxide in the presence of a catalyst which comprises contacting at temperatures from about 400°C. to 700°C., at least one gaseous sulfur oxide with a catalyst comprising at least one element from the group consisting of the lanthanide periodic group, at least one element selected from the group consisting of the periodic groups IVB and VB and oxygen.

2. The process of claim 1 in which the catalyst comprises lanthanum, titanium, and oxygen.

3. The process of claim 1 in which the catalyst comprises cerium, titanium and oxygen.

4. The process of claim 1 in which the catalyst comprises didymium, titanium and oxygen.

* * * * *